(12) United States Patent
Link

(10) Patent No.: US 6,178,286 B1
(45) Date of Patent: Jan. 23, 2001

(54) ADAPTIVE TAPE DRIVE CONTROL IN A VIDEO RECORDER

(75) Inventor: Hermann Link, Donaueschingen (DE)

(73) Assignee: Deutsch Thomson-Brandt GmbH, Villingen-Schwenningen (DE)

(*) Notice: Under 35 U.S.C. 154(b), the term of this patent shall be extended for 0 days.

(21) Appl. No.: 08/990,225

(22) Filed: Dec. 15, 1997

(30) Foreign Application Priority Data

Dec. 18, 1996 (DE) .............................................. 196 52 771

(51) Int. Cl.[7] ...................................................... H04N 5/76
(52) U.S. Cl. .......................... 386/46; 386/68; 360/73.05; 360/73.08; 318/369; 318/590; 318/592
(58) Field of Search ..................................... 318/590, 592, 318/594, 600, 599, 618, 362, 382; 386/125–126, 109, 112, 80, 84, 66, 85, 96, 98, 113, 1, 6–8, 14, 68, 46, 78–81; 360/69, 71, 73.01, 73.04, 73.05, 73.08

(56) References Cited

U.S. PATENT DOCUMENTS

| | | | |
|---|---|---|---|
| 4,224,645 | * 9/1980 | Mauch | 360/73 |
| 4,494,153 | * 1/1985 | Ravizza | 358/324 |
| 5,432,419 | * 7/1995 | Watanabe et al. | 318/560 |
| 5,473,239 | * 12/1995 | Kobayashi et al. | 318/798 |

FOREIGN PATENT DOCUMENTS 2904009   8/1979   (DE) .............................. G11B/15/46

* cited by examiner

*Primary Examiner*—Thai Tran
(74) *Attorney, Agent, or Firm*—Joseph S. Tripoli; Joseph J. Laks; Francis A. Davenport

(57) ABSTRACT

A video recorder capstan drive motor is controlled for slow-motion, freeze-frame and similar operations by setting a rate of acceleration or braking. A speed parameter is measured during an initial acceleration phase and is compared to a predetermined desired value. Based on the result of such comparison, current to the drive motor is limited, or an existing current limitation value is increased or reduced, so as to alter the acceleration or braking and bring the tape speed more nearly to the predetermined value. A representative current value can be stored in nonvolatile storage and used for such current limitation control, for so long as conditions remain unchanged. The value can be changed when conditions change, for example due to loading of a different tape cassette or a change in operational temperature.

8 Claims, 2 Drawing Sheets

ADAPTIVE TAPE DRIVE CONTROL IN A VIDEO RECORDER

Figure 1A:
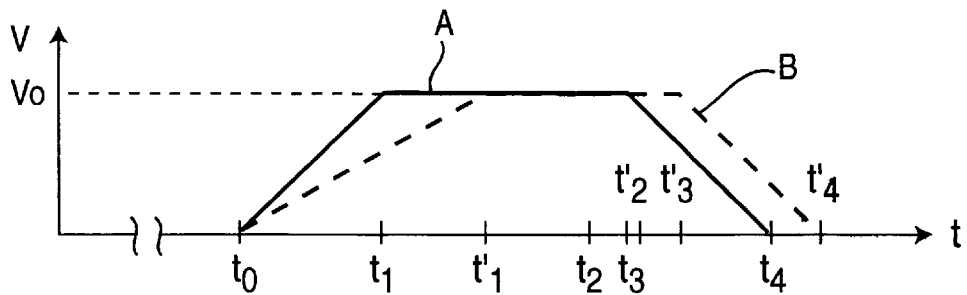

The present invention relates to a method and an apparatus for regulating the drive speed of a tape for the recording and/or reproduction of information items, such as with a video recorder, for example, in operating modes in which the tape is supposed to come to a standstill at predetermined positions.

Operating modes of this type are, for example, slow-motion reproduction and still-frame reproduction or freeze-frame reproduction, the tape being scanned by a video head in such a way that individual items of video and/or audio information recorded on this tape are respectively read out for a predetermined time. For this purpose, the tape is wound until a track which is correspondingly assigned to a video head can be scanned by the latter. After a specific time in each case, the tape is wound on in such a way that subsequent tracks can be read.

In the case of slow-motion reproduction, the respective slow-motion speed, which can usually be varied between a fifth, a tenth and also a twenty-fifth of the normal speed, results from the ratio between still-frame time and normal speed. Since slow-motion reproduction is executed by starting and braking, special requirements have to be made of the tape drive. Thus, at the beginning of the play phase, the capstan motor is accelerated by a start pulse to a speed which is to be kept constant for a relatively short time by means of regulation, and is braked again at the beginning of the still-frame phase. The control of the start and stop phases has a very complicated configuration with regard to the equipment technology and, at the same time, equipment and tape tolerances have a certain influence on the respective tracking in these special modes with a corresponding effect on the picture quality.

The object of the present invention, therefore, is to improve the picture reproduction quality for operating modes of the aforementioned type.

The invention is based on the idea, in the context of slow-motion and freeze-frame reproduction, of detecting the rotor movement of the capstan motor and thus the tape drive speed as early as during the start phase characterized by acceleration, and of compensating for any deviations from a desired speed characteristic that occur by means of corresponding changes in the acceleration of the tape drive.

According to the invention, therefore, a tape drive speed measurement is carried out at least once even during the respective start phase and the respective measured value is compared with a corresponding value of the desired speed characteristic, thereby enabling a correction to be carried out by means of corresponding control of the capstan motor in the event of a deviation. This has the advantage that deviations in the start phase can have practically no effect or are compensated for at least to the extent that only slight corrections are necessary for optimum tracking after the start phase. These corrections can then be made in the stop phase if such measures are also provided for this region.

The respective desired speed characteristic for optimum tracking in the operating modes of the aforementioned type is stored in the recorder and is already determined or calculated with the development of the respective equipment type.

The start phase and thus the acceleration of the capstan motor to a specific speed, which is then kept constant by means of corresponding speed regulation until the beginning of the respective stop phase characterized by braking, is effected by a pulse-like exciter current fed to it. This exciter current, which usually represents a maximum value of the current that can be supplied, and is an average value, in this case determines the characteristic of the tape speed in the start phase.

This means that a speed characteristic to be attained can be determined by a corresponding change in the exciter current, something which is utilized, according to the invention, for changes in the acceleration of the tape drive during its start phase in that, in the event of deviations from the respective desired speed characteristic, corresponding changes in the exciter current towards larger values are made in the case of an excessively low tape drive speed and corresponding changes towards smaller values are made in the case of an excessively high speed, it being possible, in an advantageous manner, to carry out the changes during predetermined time windows. By using time windows, relatively large acceleration changes can be made without, in the process, exceeding the value of the already mentioned speed which is to be kept constant between the start and stop phases by means of regulation, or overloading the motor.

Such changes in the pulse-like exciter current can be realized e.g. as corresponding instances of amplitude limiting or, in the case of motor driving by means of PWM signals, by means of corresponding mark-space ratios.

However, the values determined in this way for the respective changes in the exciter current apply, strictly speaking, to the tape used or the recording medium in tape form which is stored in a cassette. In the event of further use of the recording medium, that is to say use that is not interrupted by a cassette change, the exciter current limiting values determined first of all can be stored for renewed activations of special modes of the aforementioned type, with the result that recalculations can advantageously be obviated. Recalculations of corresponding exciter current values are then made only in the event of a cassette change and also in the event of changes in the operating conditions, for example owing to ageing or a considerable temperature change.

The invention is explained below with reference to the drawing, in which

Figure 1B:
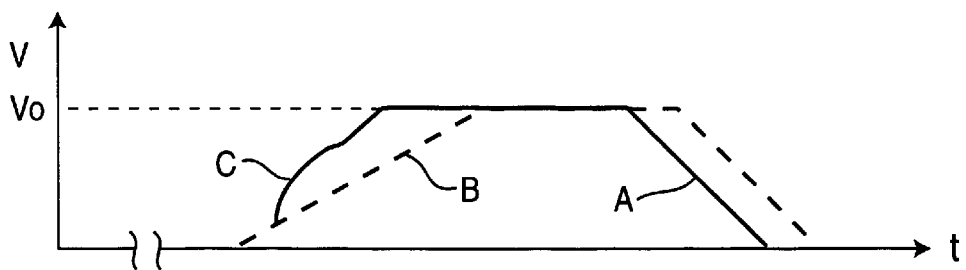
Figure 3:
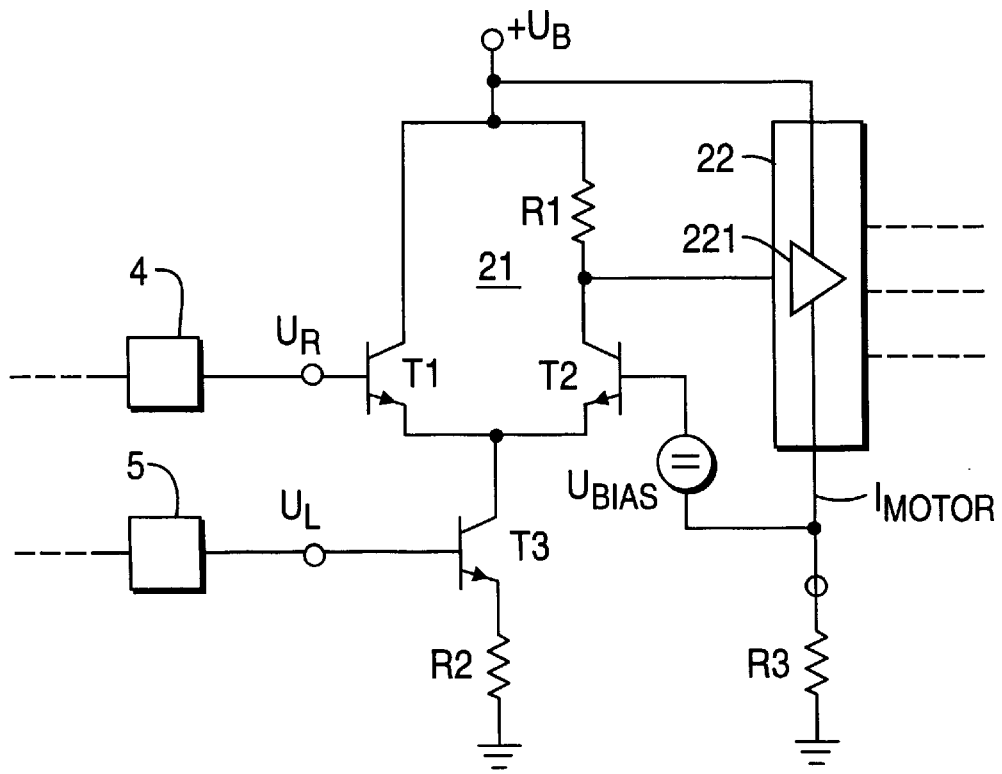
Figure 2:
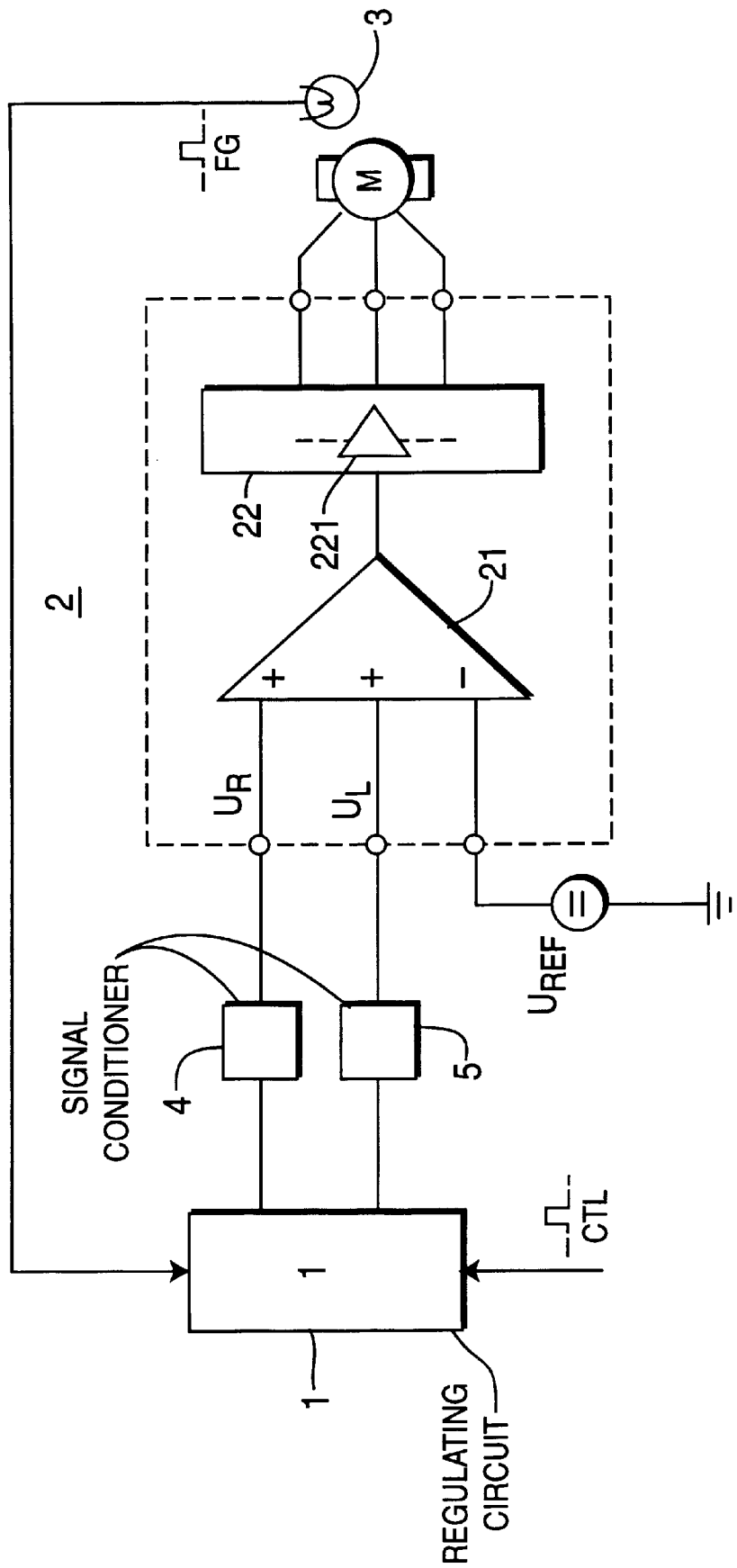

FIG. 1 shows a diagram with a tape drive speed characteristic typical of slow-motion and freeze-frame reproduction, FIG. 2 shows a simplified block diagram of the capstan servo circuit, and FIG. 3 shows a control circuit for the control of the tape drive in the manner according to the invention.

Using diagrams a) and b), FIG. 1 diagrammatically shows exemplary speed characteristics A, B and C effected by means of a capstan motor M (FIG. 2) during the feed of a recording medium in tape form (not illustrated), called tape below, in the special operating modes of slow-motion reproduction and freeze-frame reproduction, the ordinates of the diagrams being a measure of the tape speed v, while the abscissae of the diagrams form a measure of time t. A represents the desired speed characteristic, C represents the speed characteristic according to the invention and B represents the actual speed characteristic.

During the respective start phase $t_0$–$t_1$ and $t_0$–$t'_1$ and also during the stop phase $t_2$–$t_3$ and $t_2$–$t'_3$ characterized by braking, the motor M is supplied with one or more voltage or current pulses which are predetermined in terms of their amplitude and duration and cause the motor M to be accelerated to the speed $V_{desired}$ to be regulated or, upon reaching the desired position of the tape with regard to the scanning video head (not illustrated), to be brought by this to the speed $V_0$ or to a standstill. In order to measure the respective tape speed, the train of pulses FG which is emitted by a tachogenerator, rigidly coupled to the motor M, during the motor movement is used in this case in a known manner. The respective control pulse CTL recorded as synchronism signal in the longitudinal track of the tape is used as a reference for the initiation of a stop operation.

The speed characteristics A and B are each characterized by an approximately linear speed increase and decrease in the start phase and in the stop phase, respectively. As illustrated by the characteristic B, the start phase may be prolonged by the time difference $(t'_1-t_1)$, for example on account of a load change owing to a tape cassette change. The consequence of this is that the respective tape feed is also ended later, that is to say not until the instant $t'_3$, the aforementioned load change not having been taken into account for the characteristic B. Tracking errors occur as a result on account of the heads which scan the tape and rotate at a constant speed.

According to the invention, therefore, a tape drive speed measurement is carried out at least once even during the respective start phase and the respective measured value is compared with a corresponding value for the desired speed characteristic A, with the result that—as illustrated by the characteristic C which, for the sake of simplicity, differs from the desired characteristic A only in the start phase—in the event of deviations from the desired speed characteristic, corrections can be implemented by means of control of the capstan motor M that effects corresponding acceleration changes.

Using a simplified block diagram, FIG. 2 shows a servo circuit for the tape drive, in which, in addition to the electronically commutated capstan motor M, an electronic motor control circuit 2, a tachogenerator 3, which is rigidly coupled to the motor shaft, two signal conditioners 4, 5 and a circuit 1 for regulating and controlling the capstan motor M are illustrated. The circuit 1 may, for example, be part of a microprocessor for servo and sequence controllers that is used customarily in today's video recorders.

Of the motor control circuit 2, which may likewise be designed as an integrated motor circuit, only the blocks 21 and 22 which are essential for describing the invention are illustrated for the sake of simplicity, block 22 being intended to represent the output stages which supply the capstan motor M with exciter current and electronically commutate the said motor, while block 21 is intended to relate to an amplifier circuit for setting the respective exciter current. The output stages which are controlled by the output signal of the amplifier 21 may be designed as bridge output stages 221, for example.

The amplifier circuit 21, of which a detailed exemplary embodiment is illustrated in FIG. 3, has, in addition to an inverting control input, a first and a second non-inverting control input.

The first non-inverting control input is connected via the first signal conditioner 4 to a first signal output of the circuit 1. This signal connection serves for the supply of the regulating voltage $U_R$ which is generated in the circuit 1, varies correspondingly during the speed regulation of the capstan motor M in the event of regulation deviations and assumes a constant value for a maximum exciter current in the start phase until the beginning of the speed regulation.

The second non-inverting control input of the amplifier circuit 21 is connected via the second signal conditioner 5 to a second signal output of the circuit 1. This circuit connection serves for the supply of a control voltage $U_L$ which is generated in the circuit 1 and determines the speed characteristic in the start phase or until the beginning of the speed regulation by limiting the maximum exciter current, in that the control voltage $U_L$ is kept at a constant value and is correspondingly varied in the event of corrections (see characteristic C in FIG. 1) on account of deviations from the desired speed characteristic A, the respective variation of the control voltage $U_L$ preferably being effected during predetermined time windows. The control voltage $U_L$ is kept at a constant value during the speed regulation, however.

The control voltage $U_L$ and the regulating voltage $U_R$ are each output in the form of a PWM signal from the circuit 1, which signal is shaped by the signal conditioner 4 or 5, formed by an RC low-pass filter in the simplest case, into a signal having a continuous characteristic, before it reaches the first or second non-inverting control input of the amplifier circuit 21.

The inverting control input of the amplifier circuit 21, on the other hand, is connected via a reference voltage source $U_{ref}$ to reference-earth potential. In order to regulate and control the motor M, the pulses FG generated by the tachogenerator 3 and the CTL pulses used as sync signal by the longitudinal track of the tape are fed to the circuit 1.

FIG. 3 shows the amplifier circuit 21 for the control of the tape drive in the manner according to the invention. It is essentially formed by a differential amplifier stage with a constant-current source. The differential amplifier stage essentially comprises the two npn transistors T1 and T2, the base of the transistor T1, which base forms the first non-inverting control input, being connected via the signal conditioner 4 to the circuit 1, while the base of the transistor T2, which base forms the inverting control input, is connected to the reference voltage $U_{ref}$. In this case, the reference voltage $U_{ref}$ is preferably formed by a bias voltage $U_{bias}$ in conjunction with the voltage drop across a resistor R3 through which the motor current $I_{motor}$ flows, with the result that the reference in each case corresponds to the present motor current. As a result, the motor current and, consequently, also the force accelerating the motor M is proportional to the control voltage present at the respective control input. The signal output of the differential amplifier, which is connected to corresponding control inputs of the output stages 22 for the purpose of controlling the motor M, is formed by the collector of the second transistor T2, which, for this purpose, is connected via a load resistor R1 to the operating voltage $+U_B$.

The constant-current source arranged between the differential amplifier stage and reference-earth potential is formed by an npn transistor T3. Its emitter is connected via a resistor R2 to reference-earth potential. Its base forms the second non-inverting control input of the amplifier circuit 21, which input is connected via the signal conditioner 5 to the circuit 1.

The circuit described thus far operates as follows:

The motor M is started by the control voltage $U_L$ which—as already mentioned—determines the exciter current in the start phase, the voltage $U_R$ fed to the other or first non-inverting control input of the amplifier circuit 21 being controlled to a constant value which is predetermined for maximum exciter current until the beginning of the speed regulation. The acceleration of the motor M, as well as its speed, is monitored with the aid of the tachogenerator 3. After the start, the time until the appearance of the first tacho-pulse FG and of the following pulses FG or between them is determined. In the event of a deviation from desired values which may be stored e.g. in the circuit 1 operating as a control circuit and regulator, one or more corresponding acceleration changes are made by changing the PWM and thus the control voltage $U_L$. The speed is thereby matched to the desired speed characteristic A. The respective change in the control voltage $U_L$ is in this case preferably carried out during predetermined time windows. A counter which is present in any case in the servo processors of today's video recorders and is clocked at a clock frequency can be used, in an advantageous manner, for the respective time measurement.

As soon as the motor speed changes to the regulated state or moves into the capture range of the regulation, while maintaining the control voltage $U_L$, the voltage $U_R$ for maximum exciter current becomes the regulating voltage $U_R$ which, owing to deviations from the motor speed to be regulated, is varied correspondingly to a constant value (e.g. 23.9 mm in the case of VHS) and the magnitude of which is significantly smaller in comparison with the start phase. The stop phase is then initiated with the occurrence of the respective control pulse CTL.

In the case of slow-motion reproduction with a video recorder which is equipped with three rotating video heads, the respective tape feed may last 60 to 70 msec, for example.

In principle, the monitoring and control described for the start phase can also be applied to the stop phase.

What is claimed is:

1. A method for reproduction of signals on a recording medium in tape form in a reproduction mode with a recorder having a start phase which accelerates a speed of a tape drive motor, a middle phase which regulates the tape drive motor to a constant speed, and a stop phase which brings the tape drive motor to a standstill by braking, comprising:

measuring one of the speed and an acceleration of the tape drive motor as early as during the start phase and determining a corresponding maximum exciter current to the tape drive motor for achieving an acceleration change which corrects the tape drive motor speed in the event of a deviation from a predeterminable desired value;

storing the maximum exciter current and controlling the acceleration of the tape drive motor based on the maximum exciter current; and, again determining the corresponding maximum exciter current and storing a new value of the maximum exciter current in event of changed conditions.

2. The method according to claim 1, wherein said measuring is effected during a predeterminable time window.

3. The method according to claim 2, wherein in the event of a deviation of the speed of the tape drive motor from a predeterminable desired characteristic, one or more acceleration changes are made in the maximum exciter current such that an actual speed of the tape drive motor is approximated to the desired characteristic during the time window.

4. The method of claim 1, wherein the changed conditions include changing of a cassette tape.

5. The method of claim 1, wherein the changed conditions include a predetermined temperature change.

6. A recorder for recording onto and/or reproduction from a recording medium in tape form, the recorder having at least one special operating mode of slow-motion reproduction and/or freeze-frame reproduction, comprising:

a tape drive motor coupled to a servo circuit operable to control acceleration of a tape drive by a start phase which accelerates the tape drive, a middle phase which regulates the tape drive to a constant speed, and a stop phase which brings the tape drive to a standstill by braking;

wherein the servo circuit senses one of speed and acceleration of the tape drive as early as during the start phase and, in the event of a deviation from a predeterminable desired value, alters a current level to the tape drive motor to effect an acceleration change which correspondingly corrects the tape drive; and, wherein the servo circuit stores the current level needed to achieve the predeterminable desired value and again determines and stores a new value in event of changed conditions.

7. The recorder of claim 6, wherein the changed conditions include changing of a cassette tape.

8. The recorder of claim 6, wherein the changed conditions include a predetermined temperature change.

* * * * *